United States Patent
O'Brien et al.

(10) Patent No.: US 6,986,133 B2
(45) Date of Patent: Jan. 10, 2006

(54) SYSTEM AND METHOD FOR SECURELY UPGRADING NETWORKED DEVICES

(75) Inventors: Michael D. O'Brien, King County, WA (US); Peter Gravestock, Queensland (AU); Alan J. Pickrell, King County, WA (US)

(73) Assignee: GoAhead Software Inc., Bellevue, WA (US)

( * ) Notice: Subject to any disclaimer, the term of this patent is extended or adjusted under 35 U.S.C. 154(b) by 0 days.

(21) Appl. No.: 10/221,513

(22) PCT Filed: Apr. 13, 2001

(86) PCT No.: PCT/US01/12108

§ 371 (c)(1),
(2), (4) Date: Apr. 7, 2003

(87) PCT Pub. No.: WO01/80023

PCT Pub. Date: Oct. 25, 2001

(65) Prior Publication Data

US 2003/0208569 A1  Nov. 6, 2003

Related U.S. Application Data

(60) Provisional application No. 60/197,125, filed on Apr. 14, 2000.

(51) Int. Cl.
*G06F 13/00* (2006.01)

(52) U.S. Cl. .................................................. 717/173
(58) Field of Classification Search ................ 370/338, 370/401; 709/221, 222, 200, 220, 201; 713/1, 713/2, 100; 717/168, 171, 172, 173, 174, 717/176, 177, 178
See application file for complete search history.

(56) References Cited

U.S. PATENT DOCUMENTS

| | | | | |
|---|---|---|---|---|
| 5,848,064 A | * | 12/1998 | Cowan | 370/338 |
| 6,031,830 A | * | 2/2000 | Cowan | 370/338 |
| 6,049,671 A | * | 4/2000 | Slivka et al. | 717/173 |

* cited by examiner

*Primary Examiner*—Robert B. Harrell
(74) *Attorney, Agent, or Firm*—NorthWest Patent Group; James Davison (57) ABSTRACT

A system (FIG. 1) for upgrading deployed networked devices (4,6,8,10,12,14,16). The devices are enabled with an installed agent (FIG. 2 left) that can identify and communicate with a server (22) running the upgrade program. When the appropriate conditions are met the server downloads the upgrade to the agent that then installs the upgrade onto the deployed device. The device is made capable of polling the server to see if an upgrade is available, or, in the alternative, the server can locate the device, query the state of the device and, when the appropriate predetermined conditions are met, download the upgrade to the device.

7 Claims, 2 Drawing Sheets

SYSTEM AND METHOD FOR SECURELY UPGRADING NETWORKED DEVICES

FIELD

This invention relates to the field of deployed computing systems and, more particularly, to the upgrading of these systems.

BACKGROUND

This application is entitled to the filing date 14 Apr. 2000 of provisional application 60/197,125.

Manufacturers and operators of networked devices need a comprehensive solution for automatically upgrading the devices, particularly those that are remotely located. These upgrades can provide the deployed devices with new features, reliability enhancements, performance improvements, updated applications, updated application data, security patches, and bug fixes. The present invention removes the end-customer burden of manually upgrading remote devices and reduces the manufacturer's expenditures for costly support visits and product recalls. This invention provides manufacturers of deployed devices with a powerful competitive advantage by reducing their support costs and addressing their customers' increasing expectations for reliability, easier manageability and reduced cost of ownership. The invention consists of three parts, a development environment used to configure a device specific agent embedded in the target device, a server computer to create and publish upgrades, and the specific agent software itself.

Since the present invention incorporates a device-initiated approach to upgrades, the many disadvantages of server-initiated upgrades are obviated.

These present invention allows the server to be stateless. Stateless servers don't need to keep a record of previous interactions with the deployed devices. Therefore the server need not detect and track which device was upgraded and when said device was upgraded. This also means that since the device does the requesting that there is no problem with network firewalls that keep out unwanted or undocumented communication. If an upgrade is interrupted the deployed device just makes the upgrade request again and continues where it left off when the interruption occurred. To make an upgrade available for a set of target devices, the manufacturer of the device creates an upgrade module. An upgrade module consists of the upgrade image and the security keys used for authentication and data verification. The upgrade module also contains the policies that the manufacturer defines to govern the distribution of the upgrade. We use the term manufacturer throughout this disclosure to mean anyone desiring to make deployed devices that can be upgraded remotely. Upgrade policies control which devices are authorized to receive upgrades. These policies can be based on specific criteria such as host name, schedule, or desired pace of the rollout. For example, these policies could be used in conjunction with the manufacturer's support policy to provide upgrades only to those end customers that desire them.

The upgrade process is secure, reliable, and restartable. It leverages industry-standard TCP/IP and HTTP protocols. The device initiates a request to the upgrade server using a specially designated URL, port and security keys that have been previously programmed into the deployed device. The server processes the request by verifying the security key, matching the request with the available upgrade modules residing on the server, and validating the request with the policies defined for that upgrade module. If the request is validated, the server notifies the device that a valid upgrade is available. The device then initiates the download, verifies the integrity of the image, and authenticates the source using the National Institute of Standard and Technology (NIST) Digital Signature Standard (DSS). After a successful download, the device applies the upgrade, as appropriate, using a device specific mechanism defined by the JavaScript (a trademark of Sun Microsystems) or executable process, and sends an acknowledgement to the server.

The process to create and package the agent software starts with creating the security keys. These keys will be transferred to the server and used in the process of publishing an upgrade. The agent itself is then created and deployed into the device. The agent includes the upgrade components, the public key, configuration informatioh and optional embedded JavaScript files.

The upgrade component represents an upgradeable entity on the target device, for example, a printer driver, and defines the upgrade configuration for that entity. The agent is included into every deployed device and enables the device to automatically find and download new upgrades. Moving these files to the target device using standard file transfer procedures deploys the files that make up the agent. Executing the files or binaries in any way the operating system provides completes the deployment. The execution of these files normally occurs during device boot-up but could also be deployed by a scheduler or via manual request. The upgrade module that is made available to the device using the embedded agent is then created. The module is then published on the server. Upon request from the deployed device the server then transfers the upgrade to the device. The embedded device agent then applies the upgrade.

The server used for the upgrades is similar to a Web server and is deployed in the same manner. The server receives HTTP-based upgrade requests from the deployed devices and is made accessible to those devices by a TCP/IP network. The connection can be made over the Internet, the intranet, a VPN (Virtual Private Network), or through a dialup connection.

Using a embedded subset of JavaScript in the deployed device allows the file size to be minimized. The capabilities of the embedded JavaScript used include arithmetic operators, logical operators, global functions, local and global variables and the "if", "else", "for" and "return" keywords. The embedded JavaScript functions not supported are floating point numbers, arrays, objects and function declarations. The embedded JavaScript subset provides typical scripting functionality as well as a mechanism for binding embedded JavaScript function calls to computationally intensive C functions. As with any scripting language, one of the primary advantages is the quick and easy development, cycle-compiling and linking is not necessary. Disadvantages include the lack of privacy, since scripts are deployed in source form, and slower performance than compiled code, although recent developments have made the code run faster. The embedded JavaScript subset used has its global variables active for the life of the agent running. Therefore it exists beyond the life of the script. An application written in "C" can declare and set these variables. The variables are then accessible by any script evaluated by the engine. This allows data to be passed from one script to another. The embedded JavaScript subset can declare "C" functions, these functions may then be used by any embedded JavaScript subset that may be interpreted by the engine. This violates the normal security associated with the JavaScript language, but it does allow the application running on the deployed device to define and execute any action with all the benefits of compiled "C". This binding mechanism also allows the application to extend functions such as "load-Module". Many of these functions are overloaded to provide different execution based on the number of parameters passed. Since the embedded JavaScript subset used is a non-typed language, the number of parameters is the sole criteria for determining which behavior to take. To implement the upgrade process a number of functions have been added to the JavaScript interpreter included with the upgrade agent. These functions can be used with any JavaScript file used by the upgrade agent or server. All JavaScript variables are stored as strings. Therefore, these functions all return a string value to the script. The "C" function employed can be invoked by the JavaScript subset or by executed processes. These functions enable developers to increase the configurability and functionality of the upgrade agent. The JavaScript subset can load and call "C" functions by using the callFunction JavaScript API or by binding the function to a new JavaScript API using addJsFunc as is later described. Many of the following functions are standard system APIs preceded by the character "g". Generally, if the in-memory file system feature of the upgrade agent is not being used, then these APIs are converted to standard system calls. If the in-memory file system is used, they are converted to an in-memory equivalent function where the "g" is replaced with an "im" and the first letter of the standard name is capitalized.

SUMMARY

The present invention describes a system and method for upgrading a deployed device in a networked computer environment by adding to the deployed device the capability of polling a networked server, then determining if an upgrade is available for the device. If an upgrade is found on the server that is appropriate for the deployed device then that upgrade is downloaded and installed. This method also takes into account the necessity of authenticating and verifying that the upgrade is from the appropriate server and that the update itself has not been modified during transmission. The deployed device may have a number of different software components installed. The server is capable of upgrading just those components that require changes. The components that reside on the deployed device may be identified by name, version, host name of the server providing the upgrade, the port number for the requests to the server that is to provide the update, the polling schedule, the retry period and the number of retry attempts to be made, among other characteristics. The networked server can also contain a number of policies to be followed by the server to determine, among other things, what upgrades are to be installed into which devices. Pushing the upgrade toward the deployed device instead of the deployed device polling the server can also use this method of providing upgrades to deployed devices. The deployed device can register itself with the server and if the appropriate conditions are met the server will initiate a timely download of any and all downloads that may be appropriate.

Other objects and advantages of the invention will become apparent upon reading the following detailed description and upon reference to the accompanying drawings in which:

DETAILED DESCRIPTION OF THE PREFERRED EMBODIMENT

Architecture and Operation

The present invention is a suite of software that allows manufacturers to upgrade their remote devices simply and securely. It uses a client/the server model that utilizes HTTP 1.1, a standard Web protocol.

Figure 1:
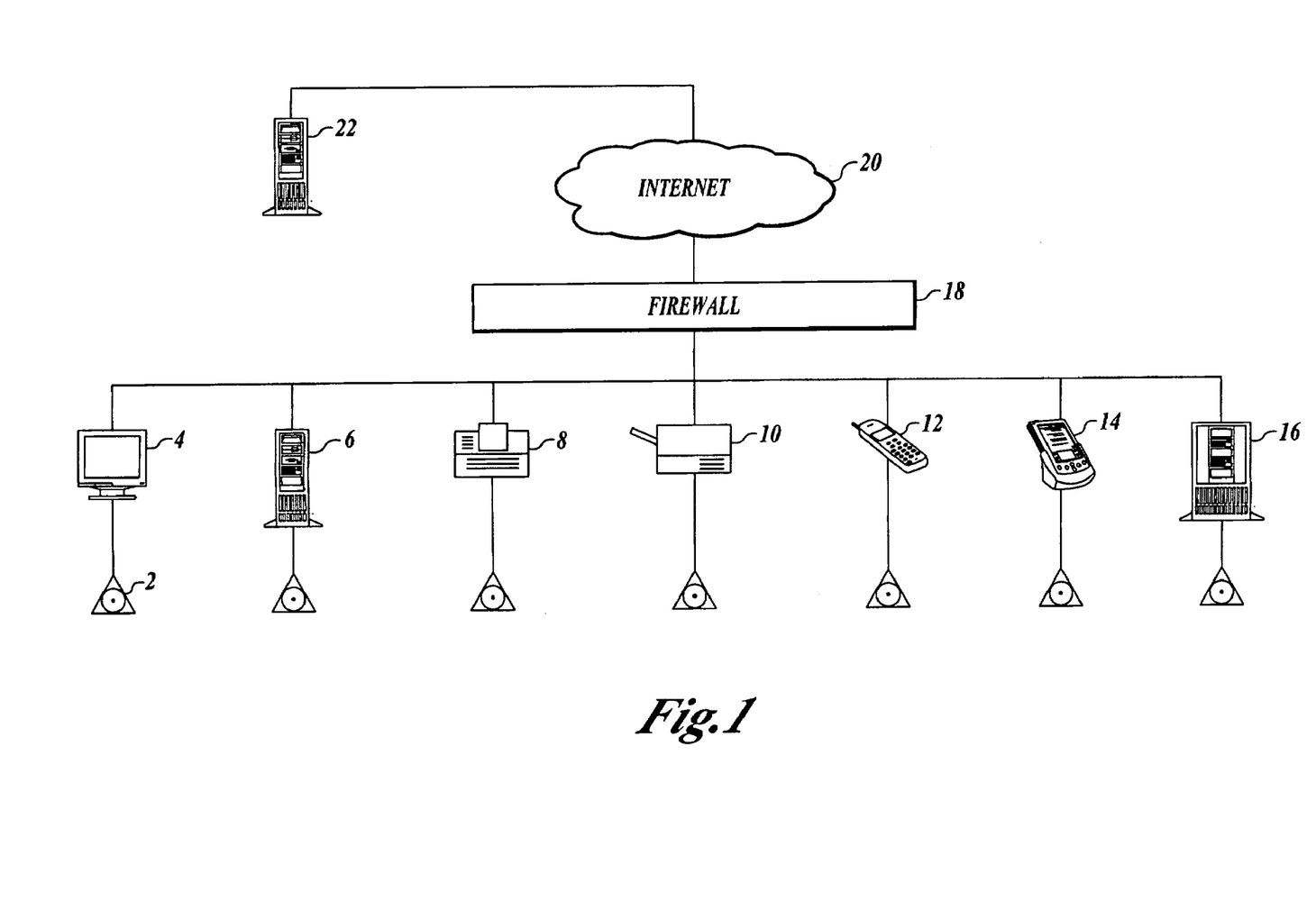
FIG. 1 shows the overall architecture of the system with various deployed devices shown.

As shown in FIG. 1 the present invention works in exactly the same way as a standard Web server 22 receiving requests from a standard Web browser through the Internet 20 and server firewall 18. Just think of the server as a Web the server located at a central site, and the installed device agent 2 as a browser. From time to time, a Web browser requests data from the Web the server, and the Web the server responds by sending the requested data back to the browser. Similarily, the agent requests data from the server at scheduled times, and the server responds by sending back the requested data. The deployed device can be a number of things: a monitor 4, another server 6, a printer 8, a copier 10, a cell phone 12, a PDA 14, or a system using a compact PCI or any other interconnect system 16.

Essentially, the server is a centrally located the server on which upgrades are published, and the agent is a software component embedded in devices that polls the server for upgrades and requests them when they are available. The present invention uses a device-initiated approach to upgrades, which has many advantages over a the server-initiated approach. These advantages include:

1. The server is simple and stateless. It does not require complex configuration, nor does it have to detect and track multiple remote agents, which may move or be only occasionally connected to the network.
2. Upgrades can traverse firewalls.
3. Upgrades are restartable in case of interruptions. The agent keeps track of where it is with each upgrade, and continues where it left off after an interruption.
4. The server can support a large number of devices in the same way a Web server supports many simultaneously connected browsers.

The solution can be scaled to support millions of devices using standard technologies such as replication and load balancing.

Upgrade Module Publishing and Polling

Communication between the server and the agent is based on a publish/poll model. This model is explained below together with the role played by each invention component.

In an alternative embodiment the server, using the agent's URL address, can contact the agent and "push" the upgrade through to the agent.

The agent is a small piece of software that runs continuously on a device. Its main function is to poll the server for upgrade information and, if an upgrade is available, to fetch and apply it to the device. It must also do this securely by ensuring that the upgrade has come from an authorized the server and that the contents have not been tampered with during transmission. The agent accomplishes this by authenticating and verifying the upgrade via the digital signature that is included in an upgrade module.

An agent can support many upgradable entities. For example, if the agent is running on a printer, it may be required to upgrade the printer's TCP/IP stack as well as its PostScript engine. In addition, upgrades for each of these entities may come from different servers.

The agent handles these capabilities through the concept of Upgrade Components. In the example of the printer above, the TCP/IP stack is one component and the PostScript engine is another. Upgrade Components are defined in the user configuration module and are packaged as part of an agent. An Upgrade Component is defined with the following information:

Name

Version

Host name or address of the the server providing upgrades for this component

Port number for requests to this server

Polling schedule, retry period, and number of retry attempts

Once an Upgrade Component has been defined, it is packaged up with the agent for the target device's particular platform.

The server's main function is to allow system administrators or other support staff to publish new upgrades and monitor the progress of existing upgrades while responding to upgrade requests from remote agents.

To publish an upgrade, administrators specify the files that constitute the actual upgrade (the upgrade payload), as well as configuration and policy information. Upgrade policies enable system administrators to control upgrade rollouts by specifying which target devices will or will not receive a specific upgrade. The payload is then combined with this information and a digital signature to produce an upgrade module. The digital signature is used by the agent to authenticate the server and to verify the integrity of the upgrade data.

Part of an upgrade module's configuration information is the Upgrade Component that the upgrade is to support. As mentioned earlier, Upgrade Components are defined in the user configuration module, and are packaged as part of an agent application. An agent polls a server for published upgrade modules that support its components. If one is available, the agent requests it. In an alternative embodiment the server "pushes" the upgrade to the agent.

Continuing to use the example of the printer, let's assume that a system administrator is tasked with upgrading the TCP/IP stack on every printer on a network from version 6.0 to version 6.5. The printer runs the agent with an Upgrade Component for the stack. Let's assume the component is named "tcpip" and that its version is 1.0.

To accomplish the upgrade, the system administrator creates an upgrade module using the server. He or she gives the module a name and description, indicates that it's for version 1.0 of the "tcpip" component, sets the new version of the component (after the upgrade) to 2.0, and specifies the upgrade payload. The system administrator may also apply an Upgrade Policy to control the rollout of the upgrade by IP address, hostname, ratio (e.g., one of every two), or a schedule. Or, the system administrator may apply a JavaScript policy for even more control. Finally, the system administrator enables the module, and it is now "published."

The agent in the printer then polls the server to discover whether an upgrade is available for version 1.0 of the "tcpip" component. Once the agent verifies the availability of the upgrade, it requests the upgrade and applies it to the printer. Once the upgrade is complete, the printer is running version 6.5 of the TCP/IP stack and the version of the "tcpip" component rolls to 2.0.

Agent Execution

Listed below are the typical agent execution steps.

1. Start at device boot time.
2. Parse the upconfig.txt file.
3. If security is enabled, load the security library.
4. If JavaScript is enabled, load the JavaScript library.
5. Run the developer's optional JavaScript.

Run config.js for optional configuration of the agent.

If broadcasting is enabled, run bcast.js, send the return as part of a broadcast packet to the server, and read the response, if any. The period of time the agent waits for a response is set in the agent's main program (main.c).

Run startup.js to perform optional user-input controls over the upgrade process.

The agent is now fully configured and ready to process upgrades.

6. Calculate the time to commence upgrading for all components.
7. Loop through:

Sleep until the next time to upgrade.

Wake and perform the upgrade.

If JavaScript is enabled, run reqdata.js at upgrade request time and progress.js at chunk receipt time.

After the upgrade payload has been received, execute upgrade.js and/or the upgrade executable received with the upgrade in order to apply the upgrade.

Calculate the time for the next upgrade and reschedule the upgrade accordingly.

Run the optional finish.js JavaScript file.

8. Exit

If JavaScript is enabled, run exit.js.

The Upgrade Process

This demonstrates the steps involved in the upgrade process. The process begins when the agent determines it is time to perform an upgrade for a particular upgrade component. The upgrade schedule for a particular component is defined when the component is first created in the user configuration module or at run time.

Figure 2:
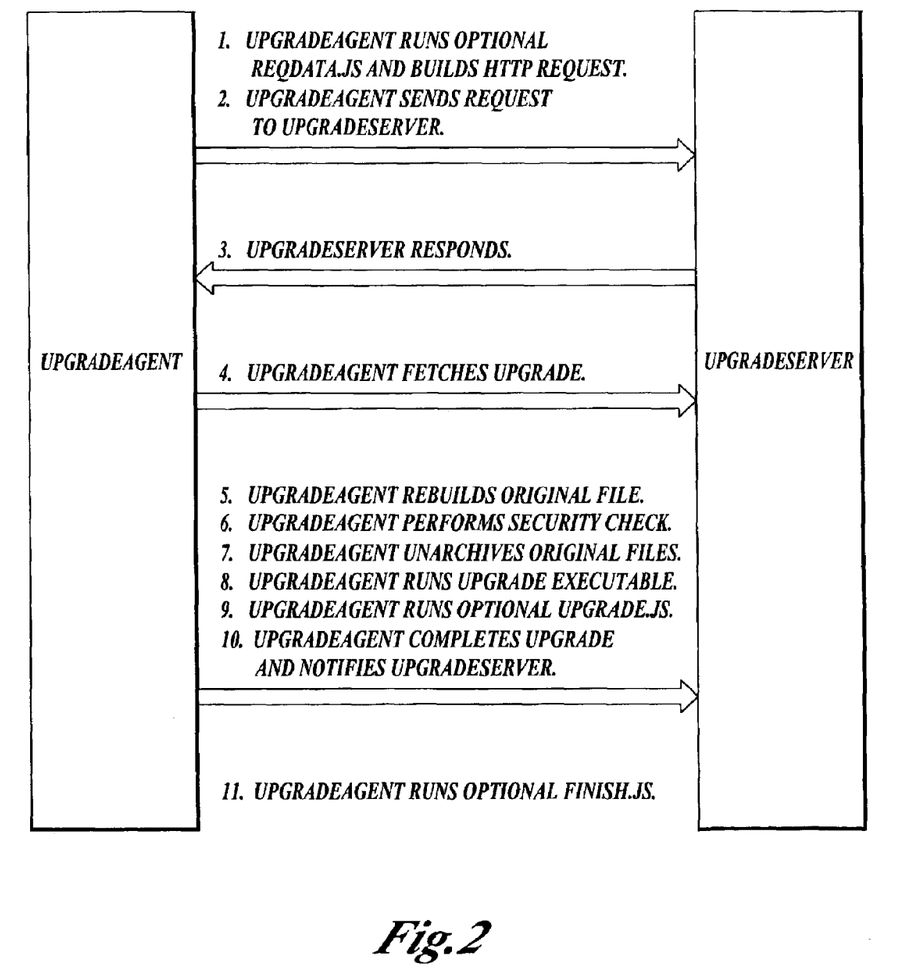
FIG. 2 shows a sequence in which the deployed device receives an upgrade download.

FIG. 2 outlines the following steps:

1. Agent runs optional reqdata.js and builds HTTP request.
2. Agent sends request to the server.
3. The server responds.
4. Agent fetches upgrade.
5. Agent rebuilds original file.
6. Agent performs security check.
7. Agent unarchives original files.
8. Agent runs upgrade executable.
9. Agent runs optional upgrade.js.
10. Agent completes upgrade and notifies the server.
11. Agent runs optional finish.js.
1. The agent builds an appropriate HTTP request for the component.

How the request is built depends on the upconfig.txt per-component the serverName, the serverPort and the serverForm parameters, as well as the agent's proxy configuration parameters.

If JavaScript is enabled and the optional reqdata.js JavaScript file was packaged as part of the Agent application when it was created, then the agent calls the JavaScript file and the result is appended to the request along with other important information, including the component's current version.

2. The agent sends the request to the appropriate the server.

If the request fails, the agent tries again based on the upconfig.txt per-component retryPeriod and retryAttempts parameters.

3. The server responds.

The response may indicate that no upgrade is available. If this is the case, the agent sleeps until the next upgrade is scheduled to occur, which may be the upgrade for another component.

The response may indicate that an upgrade is available. If this is the case, the the server will return information to the agent specifying where the contents of the upgrade are located, how many chunks make up the upgrade, a list of checksums, and so forth.

4. The agent fetches the upgrade.

The agent fetches the upgrade one chunk at a time and compares each chunk against the appropriate checksum. If any files are corrupt, it re-fetches them.

5. The agent rebuilds the original archive file. Once the agent has fetched all the chunks, it joins them together to rebuild the original archive file.

6. The agent performs a security check.

A manifest file is always part of the received payload, and it contains a digital signature for the payload. The signature is dependent on the payload data as well as the private and public security keys generated in The user configuration module and imported into the server.

The agent verifies the signature and, if it is valid, it is assured that the upgrade came from the appropriate The server and that the data was not tampered with or corrupted during transmission.

7. The agent unarchives the original constituent files.

This file is then unarchived to reproduce the original constituent files (the upgrade payload).

8. The agent runs the upgrade executable file.

If an upgrade executable is included in the payload, the agent runs it. Under VxWorks, the file must be called.upgrade.o. Under Windows NT (a trademark of the Microsoft Corporation), it must be called upgrade.exe. Under Linux, it must be called upgrade. The agent will not proceed with the upgrade until the executable terminates successfully.

9. The agent runs the optional upgrade.js file.

If JavaScript is enabled for the agent and an upgrade.js file is included in the payload, the agent runs it. The agent will not proceed with the upgrade until the JavaScript terminates successfully.

Note: Steps 8 and 9 are mechanisms that can be used to perform component-specific actions on the agent to control how the upgrade is applied. Often, these actions are very simple, such as replacing an old file with a new one from the upgrade payload. The actions can be much more complex however, such as requesting authorization from a device user before applying the upgrade.

10. The agent completes the upgrade process.

The agent removes any temporary files that were created during the process, changes the component's version to the new version, and sends a response to the server indicating a successful upgrade.

11. The agent runs the optional finish.js file.

If JavaScript is enabled and a finish.js file exists in the agent's js directory, the agent runs the file. The finish.js file is packaged up with the agent application when it is created in The user configuration module.

Priority Considerations

The agent is designed to have a low impact on CPU usage. In addition to using very efficient code, each upgrade process is divided into many small segments, and the CPU resource is released between each one. This approach prevents the agent from consumimg a large percentage of the CPU if other tasks are running concurrently. Settings of the chunkPause and granularity parameters (set by The user configuration module in the upconfig.txt file) provide some control over this behavior.

There is a part of the task, however, that is CPU-intensive. Once the upgrade payload chunks have been received, the agent joins the chunks, verifies the payload manifest and signature, and then unarchives the payload files. If the payload is very large, this can take a significant amount of CPU resource for several seconds. To avoid hogging the resource, the agent reduces its execution priority during these tasks.

The priority scheme used by each operating system differs. The following describes how the agent sets its priority in each operating system.

Windows 95/98/NT (A Trademark of the Microsoft Corporation)

Windows defines aset of execution priority classes. It is expected that the agent is started as a NORMAL_PRIORITY_CLASS process. During the CPU-intensive tasks, the agent resets itself to run as an IDLE_PRIORITY_CLASS process. When the CPU-intensive tasks are complete, the agent resets itself back to NORMAL_PRIORITY_CLASS.

VxWorks®

VxWorks tasks run at a priority level from 0 to 255, with 0 being the most favorable. The priority at which the agent runs is defined by the user in the taskSpawn call that launches the agent. When the CPU-intensive tasks are reached, the agent will reset its priority to be half-way between its startup priority and 255. When the CPU-intensive tasks are complete, it will reset its priority to the startup level.

LINUX®

Linux processes run at a priority (nice) level from –20 to +20, with –20 being the most favorable and 0 (zero) being normal. Only processes owned by the Linux superuser can adjust their priority to a more favorable setting. Therefore, no priority adjustments are made unless the agent process is owned by superuser. The trace file will indicate that the priority could not be changed. If superuser is the owner, the agent will reset its priority to level 10 when the CPU-intensive tasks are reached. When the CPU-intensive tasks are complete, the agent will reset its priority to the startup level.

Windows CE®

Windows CE handles priorities as individual execution threads. In a similar manner to the Windows 95/98/NT discussion above, the agent will reset its priority to a lower class during execution of CPU-intensive tasks.

Agent Configuration and Control

The agent is a highly configurable software component. This section describes the various mechanisms available to developers for custom configuring and controlling the agent.

Typically, the agent starts when a device boots, and runs until the device is powered off. It obtains configuration information at boot up, and then performs upgrades as defined by its configuration.

There are three sources of configuration information for the agent:

The upconfig.txt file, stored in the agent's local file system;

The server's response to an agent broadcast request;

Optional embedded JavaScript files stored in the agent's local file system and/or downloaded from the server as part of the upgrade payload.

The Agent File Structure

To fully understand how to customize the configuration and behavior of the agent, developers must be familiar with its file structure. They must know where default files are located and where optional files must be placed.

Top Directory

The file structure's top directory contains the following files:

the agent's executable image, if not already linked in the device's operating system,
the agent's default configuration file, upconfig.txt,
the embedded JavaScript shared library,
the DSS security shared library.

Component Directory

The component directory is a temporary directory used by the agent to store downloaded files. This directory is emptied after each upgrade. If the payload files need to persist, use the upgrade.js file to move the files to another directory.

js Directory

The js directory is used to store optional JavaScript files, depending on whether developers want to implement embedded JavaScript to customize the configuration and behavior of the agent.

The parent directory contains global JavaScript files that control the configuration and behavior of the agent as a whole. These files are config.js, bcast.js, startup.js, finish.js and exit.js.

Per-component JavaScript files that control the configuration of the agent's individual upgrade components must be stored in individual sub-directories of the js directory. A sub-directory must be created for each component, and the sub-directory must have the same name as the component. For example, JavaScript files to configure and control a component named "tcpip" must be located in a . . . /js/tcpip/ sub-directory. The two possible per-component JavaScript files must be named reqdata.js and progress.js.

The upconfig.txt File

The primary source of configuration information for the agent is the upconfig.txt file located in the top directory of the agent's local file system. When the agent boots up, it parses the upconfig.txt file and is configured accordingly. The contents of the file are defined in The user configuration module during the creation of upgrade components and the agent applications.

The upconfig.txt file defines two types of configuration information: global and per-component. Global configuration parameters pertain to the agent application as a whole, and per-component parameters pertain to an agent component.

The upconfig.txt file is a plain, ASCII text file consisting of a keyword=value pair for each configuration parameter, with each keyword=value pair occupying a single line in the file. Keywords are case-sensitive.

The first set of keyword=value pairs consists of global parameters, while subsequent sets consist of parameters for the agent's components.

Example upconfig.txt File proxyserver=
proxyPort=0
broadcast=80
security=1
javascript=1
randomize=0
chunkPause=10
granularity=1
InMemCapacity=2000000
component=Component1
version=1.0
the serverName=my.the server.com
the serverForm=/goform/upgrade
the serverPort=3057
schedule=*9–17**1–5
period=86400
retryPeriod=60
retryAttempts=5
enable=1
component=Component2
version=3.0
the serverName=customer.the server.com
the serverForm=/goform/upgrade
the serverPort=3057
schedule=1
period=2419200
retryPeriod=60
retryAttempts=10
enable=0

Global Configuration

Table 1 lists the upconfig.txt global configuration parameters. The following sections provide additional information about each parameter.

TABLE 1

Global Configuration Parameters for the upconfig.txt File

| Keyword | Type | Value |
| --- | --- | --- |
| proxyserver | String | IP Address or blank |
| proxyPort | Integer | Any valid port number or 0 |
| broadcast | Integer | Any valid port number or 0 |
| security | Integer | 1 if enabled, otherwise 0 |
| javascript | Integer | 1 if enabled, otherwise 0 |
| randomize | Integer | 1 if enabled, otherwise 0 |
| chunkPause | Integer | Number of seconds |
| granularity | Integer | Number of seconds |
| InMemCapacity | Integer | Amount of memory in bytes | proxy server

This parameter specifies the IP address of the proxy server. The server will work through to connect with this agent. This field must be defined if the server will work through a proxy server, otherwise the parameter should be blank.

proxyPort

If the proxy server is defined, this parameter must specify the proxy server port number. If a proxy server is not defined, the parameter should be set to 0.

broadcast

The broadcast parameter specifies the server port the agent must use to send a broadcast packet to the server. If Broadcasting is not enabled for this server, the parameter must be set to 0. For more information on Broadcasting, please see "Broadcasting VIA BCAST.JS AND BROADCAST.JS."

security

This parameter defines whether security is enabled for this agent. If the parameter is set to 1, security is enabled. If it is set to 0, security is disabled.

javascript

This parameter defines whether JavaScript is enabled for this agent. If the parameter is set to 1, JavaScript is enabled. If it is set to 0, JavaScript is disabled.

randomize

This parameter is useful in preventing many agents from making upgrades at exactly the same time. randomize modifies the start time of an upgrade in relation to period. randomize also affects the pause between chunks during an upgrade if chunkPause is enabled. If the parameter is set to 1, randomizing is enabled. If it is set to 0, randomizing is disabled.

> Note: When deployed, agents typically request upgrades at random times in the assigned time window (see schedule and period under "Per-Component Configuration"). However, while testing agents, developers may wish to disable this feature.

chunkPause

After receiving each chunk of an upgrade, the agent can pause for a specified amount of time allowing you to control upgrade speed and system loads. chunkPause specifies the amount of time, in seconds, the agent will wait before fetching the next chunk. If chunkPause is set to 0, the agent will not pause between chunks. If both chunkPause and randomize are enabled, the pause between chunks will vary up to the amount of time specified for chunkPause.

> Note: When the agent starts for the first time (or after rebooting), the agent waits the amount of time specified for the chunk pause before making an initial upgrade request.

granularity

Like chunkpause, granularity is meant to give you control of the load this described system puts on the device CPU. When no upgrades are currently in process, this parameter specifies the schedule granularity. For instance, if set to 30, the agent will sleep for 30 seconds, then check to see if it is time to request a component upgrade or to process some other event. If not, it will sleep 30 more seconds, then check the schedules again, and so on. The default is 5 seconds. For Windows NT agents, this granularity also specifies how often the agent checks for user input via the System Tray icon. If the granularity is too high, a user can get a very slow response to mouse clicks on the icon.

InMemCapacity

This parameter is used to specify the amount of memory in bytes to be allocated from the operating system for an in-memory file system."

Per-Component Configuration

Each agent can support multiple upgrade components, and each component is a separate and configurable entity. A component's configuration parameters in the upconfig.txt file are headed by the component's component parameter. All parameters listed after the component parameter pertain to that component, until a new component parameter is listed. Table 2 lists the upconfig.txt file's per-component parameters. The following sections provide information about each parameter.

TABLE 2

Per-Component Parameters for the upconfig.txt File

| Keyword | Type | Value |
| --- | --- | --- |
| component | String | Name of the Upgrade Component |
| version | String | Current version of the component in format x.y.z.b |
| the serverName | String | IP address or hostname |
| the serverForm | String | DO NOT MODIFY |
| the serverPort | Integer | Port number |
| schedule | String | Cron format |
| period | Integer | Number of seconds |
| retryPeriod | Integer | Number of seconds |
| retryAttempts | Integer | Number of retry attempts |
| enable | Integer | 1 if enabled, otherwise 0 | component

The component parameter defines the upgrade component's name. Each component name must be a unique string, i.e., it must not contain any spaces. For example, "mycomponent" is an acceptable name, but "my component" is not.

version

The version parameter defines the version of an upgrade component. The format for component versions must be x.y.z.b, (where x, y, z, and b are version segment numbers). The version number must have at least one segment but not more than four, and each segment must have at least one numeric digit but not more than four. The segments must be separated by periods.

Component versions are used to ensure that components are upgraded only with appropriate versions of themselves. When an upgrade module is created in the server, the component it applies to as well as the component's applicable version(s) are specified. The version the component will roll to after the upgrade is complete is also specified. When the agent requests a component's upgrades from the server, it is aware of the component's current version and will request only upgrades that apply to that version. Once an upgrade is complete, a component's version rolls to the newer one specified by the upgrade, thus ensuring that the component will receive only upgrades applicable to the newer version.

the serverName

The the serverName parameter defines the IP address or hostname of the the server that publishes upgrades for this upgrade component. The value of this parameter is the first of three parts that make up the URL the agent sends HTTP GET commands to in order to inquire about and fetch an upgrade.

the serverPort

The the serverPort parameter defines the port number to be used by the agent when making requests to the server specified by the serverName. The value of this parameter is the second part of the URL the agent sends HTTP GET commands to in order to inquire about and fetch an upgrade.

the serverForm

The value of the the serverForm parameter is the third part of the URL the agent sends HTTP GET commands to in order to inquire about and fetch an upgrade. This parameter must be "/goform/upgrade" and should not be modified.

schedule and period schedule and period work in combination, allowing precise control over when an upgrade begins. (For details, see the following sections.) The length of time required to complete the upgrade will depend upon the size of the payload and the speed of the connection between the agent and the server.

Note: If an upgrade is not completed during the scheduled time, the next upgrade will resume at the point at which it previously terminated.

schedule schedule defines the time window during which a component will be upgraded. The syntax of schedule follows a cron-like specification and is identical to that used by the Unix® cron. However, the meaning is somewhat different. Under the Unix cron, the specification defines a time at which an event will occur. In the present invention, it defines a window of time during which upgrades will occur.

The syntax of schedule is comprised of a single line made up of five fields separated by spaces or tab characters (for example, 1). A field can be:

- an integer
- a range of integers—Specify ranges of integers by placing a hyphen (-) between the low and the high values in the range, e.g., 9–15.
- a list of integers—To indicate a list of integers, use a comma-separated list, e.g., 1,3,5,8.
- an asterisk character (*)—The asterisk represents all valid values in a field. Table 3 outlines the possible values for each of the five schedule fields:

TABLE 3

Schedule Fields

| Field | Value |
| --- | --- |
| Field 1 | Specify the minute, 0–59, that you want the upgrade to start. |
| Field 2 | Specify the hour, 0–23, that you want the upgrade to start. |
| Field 3 | Specify the day of the month, 1–31, on which you want the upgrade to occur. |
| Field 4 | Specify the month of the year, 1–12, in which you want the upgrade to occur. |
| Field 5 | Specify the day of the week, 0–6 (with 0 being Sunday), on which you want the upgrade to occur. | period period defines the amount of time to wait after an upgrade is complete before another upgrade is requested (for a particular component) during the time window specified by schedule. The format of period is time in seconds. For example, if period is set to 86400, the period is one day.

Note: period is modified by the randomize global configuration parameter. If randomize is set to 0 and therefore disabled, the agent will attempt to upgrade the component at the start of the period. If randomize is set to 1 and therefore enabled, the agent will attempt to upgrade the component at some randomly chosen time during the period.

EXAMPLES

Some examples are included below to help you better understand how schedule and period work together.

To upgrade approximately every hour during the standard business hours of 9 am to 5 pm, Monday to Friday, use the following specification for schedule, with period set to 3600 seconds:

*9–17**1–5

To run the above process during the same time window, but about every half hour, simply change period to 1800 seconds.

To run an upgrade once, between five minutes before the hour and five minutes past the hour, every hour of every day, specify a period of 600 seconds and use the specification:

54–59 0–4****

To upgrade anytime on the first of every month, period should be set to 86400 (the equivalent of one day in seconds), and use the following specification for schedule:

1 retryPeriod

The retryPeriod parameter specifies the amount of time in seconds the agent will wait before attempting to re-request an upgrade for this component after failure. This parameter is typically set for a short period of time. The retryPeriod takes precedence over the schedule and period parameters. Therefore, a retry attempt may take place outside the normally scheduled upgrade period.

retryAttempts

The retryAttempts parameter specifies the maximum number of times the agent will attempt to re-request an upgrade for this component after failure. If the agent reaches the maximum number of retries, it stops the upgrade process and waits for the next scheduled upgrade.

enable

The enable parameter determines whether the component is enabled for upgrading. If set to 1, the component is enabled. If set to 0, the component is disabled and will not be upgraded until the parameter is set to 1.

Embedded JavaScript Files

The agent can optionally be configured and controlled via nine (9) custom embedded JavaScript files: config.js, bcast.js, startup.js, finish.js, exit.js, reqdata.js, progress.js, upgrade.js, and broadcast.js. These files are automatically called by the agent at certain points during its execution if JavaScript was enabled in the agent when the agent was created in the user configuration module. (broadcast.js is the exception to this. See Table 4.). The use of these JavaScript files dramatically increases the configurability and functionality of the agent, particularly since they can load and call C functions.

The JavaScript files, with the exception of upgrade.js, must be stored on the agent's local file system. upgrade.js must be included in an upgrade payload in order for it to be downloaded from the server to the agent during the upgrade process. All of the files are parsed locally on the agent by the embedded JavaScript parser.

Table 4 lists the JavaScript files and indicates where they should be stored, when they are called, and whether they affect the agent as a whole (Global), a particular Upgrade Component (Component) or a particular upgrade (Upgrade). The following sections provide additional details.

TABLE 4

JavaScript Files

| File | Description | Storage | Callout Point | Type |
|---|---|---|---|---|
| config.js | Controls the agent's configuration | Agent | Configuration (once at start-up) | Global |
| bcast.js | Controls data sent to the server with a broadcast packet | Agent | Broadcast (once at start-up) | Global |
| startup.js | Enables device users to control the upgrade process | Agent | After Broadcast (once at start-up) | Global |
| finish.js | Enables users to control the agent after the upgrade process is complete | Agent | After Upgrade (after each upgrade is complete | Global |
| exit.js | Controls clean-up before the agent exits | Agent | Exit (once at exit) | Global |
| reqdata.js | Sends additional data to the server with a request | Agent | Upgrade Request (before each component upgrade is requested) | Component |
| progress.js | Controls how the agent fetches upgrade chunks | Agent | Chunk Receipt (before each component chunk is requested) | Component |
| upgrade.js | Applies an upgrade to the device | Upgrade The server | Upgrade (after each component payload is successfully received) | Upgrade |
| broadcast.js | Sends configuration data back to an agent after the agent broadcasts | Upgrade the server | Broadcast (prior to sending a response to an agent) | Global |

Configuration via config.js

The agent calls the config.js JavaScript file after it parses the upconfig.txt file. The config.js file enables developers to dynamically change the configuration of the agent or to perform any initialization tasks that are not built in. For example, the script could load C code that gets configuration information from an LDAP the server. The script could then call the agent's JavaScript bindings to change the configuration dynamically.

Broadcasting via bcast.js and broadcast.js

Broadcasting provides you with a way to change agent configuration data over a local area network (LAN) and can be useful if you have more than one server or if you want to change the servers. Broadcasting, as it is implemented in the present invention, consists of two parts: an optional client-side file named bcast.js and a required the server-side file named broadcast.js. See the following sections for specific information about each file.

bcast.js bcast.js enables you to send additional, agent-specific data to a listening server. This optional, user-defined script is packaged up with the agent when it is created. The agent calls bcast.js during broadcast time, right after the agent is fully configured and just before it sends the broadcast packet over the LAN. The broadcast packet consists of two variables: BCAST_USERDATA and BCAST_IP_ADDR. The return value of the bcast.js script is incorporated into the broadcast packet by the agent. The server reads this data and put sit into the BCAST_USERDATA variable so that scripts running on the server have access to that data. The broadcast packet also contains the IP address of the broadcasting agent, made available to the server scripts in the BCAST_IP_ADDR variable.

Note: If no value is set for BCAST_USERDATA, the agent sets the value to none.

The socket is kept open for 5 seconds to receive a response. If no response is received during this time, the socket is closed and the agent immediately repeats the request. This cycle is repeated forever until a response is received. Existing components in the agent will not be upgraded until the broadcast response is received.

Note: This behavior can be modified, if necessary, by changing the broadcast( ) call in main.c. The parameters that can be modified are: number of times to request, time to wait before repeating the request, and time to keep the socket open to listen.

bcast.js can also consist of JavaScript that gets parsed by the server when it receives the broadcast packet to, for example, send additional and unique configuration information back to the agent (see broadcast.js below).

broadcast.js

When the server receives a broadcast packet, it runs a JavaScript file named broadcast.js. This file is required. The user must write this file, which must be stored in the /apps/companyname/uptheserver/js/ server directory. The broadcast.js file has access to the BCAST_USERDATA and BCAST_IP_ADDRESS variables sent via the bcast.js file. Whatever the broadcast.js file returns is sent back to the agent that sent the broadcast packet. Below is an example of the contents of the broadcast.js file:
return("component=test
   version=1.0.0
   the serverName=574.52.40.010");

Note: If you don't want changes to configuration and version information to be overwritten after the agent restarts, bcast.js and broadcast.js should be written such that, once a broadcast packet is sent to the agent, it won't be sent a second time.

User Control via startup.js and finish.js

The startup.js file is intended for use with devices that provide user input, the aim being to enable users to control the upgrade process. startup.js can access the device's user interface so that users can override the default scheduling mechanism.

Similarly, finish.js provides for user control following the upgrade process. Typically, this script allows users to enable and disable components. If the script carries out these actions, the functions startUpgrade and stopUpgrade should also be called as appropriate.

Cleanup via exit.js

The exit.js file is run just before the agent finishes executing. This file allows developers to run cleanup functions, if required.

Additional Request Data via reqdata.js

Before the agent requests an upgrade for a particular component from the appropriate server, it calls the component's reqdata.js file. This enables developers to send additional information to the server with each request. The data returned by the reqdata.js script is passed to the the server which parses it into the USERDEFINED JavaScript variable. This information can be passed to JavaScript on the server for processing, such as a JavaScript Upgrade Policy (see "JavaScript Upgrade Policies").

> Note: Since the reqdata.js file applies to a particular component, the file must be stored in a sub-directory of the . . . /js/ directory named exactly the same as the component.

Chunk Receipt Control via progress.js

The agent runs a component's progress.js file after it receives each chunk of an upgrade. This enables developers to finely control how the agent downloads a component's upgrades.

> Note: Since the progress.js file applies to a particular component, the file must be stored in a sub-directory of the . . . /js/ directory named exactly the same as the component.

Applying an Upgrade via upgrade.js

A unique upgrade.js file that controls how an upgrade is applied may be included in each upgrade payload that is sent to an agent via an upgrade module. For an upgrade.js file to be included in a payload, it must be placed in the same directory as the other payload files before the payload is packaged as part of an upgrade module by the server. If a payload received by an agent contains an upgrade.js file, it is run by the agent immediately after it has received and validated the payload.

You can also control how an upgrade is applied through the execution of an upgrade task or process. On a Windows platform, this executable must be named upgrade.exe. On VxWorks, it must be named upgrade.o. On Linux, it must be named upgrade. If an executable file exists in a payload, it is loaded and executed by the agent after it has received and validated the payload. If both an executable file and an upgrade.js file are included in a payload, the executable is run first, followed by upgrade.js. the agent does not proceed with the upgrade until either or both of these files have run to completion.

> Note: If the agent is running on a VxWorks system, the upgrade.o file must have an executable entry point named upmain.

JavaScript Upgrade Policies

Upgrade policies are a feature of the present invention that enable system administrators running the server to control the rollout of upgrades by specifying which subset of a set of target devices will receive an upgrade. When a policy is applied to an upgrade, requests for that upgrade from an agent are approved or denied by the server accordingly. Upgrade policies are created in the server and can be applied to one or more upgrade modules. The most common types of policies are as follows:

> "IP Address", to restrict upgrades by the IP address of the agent,
> "Hostname", to restrict upgrades by the hostname of the agent,
> "ratio", to approve upgrades for only a percentage of requesting agents,
> and "schedule", to approve upgrades only for requests made during a specified time period.

JavaScript policies enable developers to control the rollout of upgrades even more precisely than the four types of policies listed above. To implement a JavaScript policy for an upgrade module, developers must write an appropriate JavaScript file, and system administrators must create an upgrade policy of type "JavaScript" in the server, enter the JavaScript's pathname as the policy type parameter, then apply the JavaScript policy to the upgrade module. For the sake of consistency, it is probably advisable for developers to store JavaScript policy files in the /apps/company/uptheserver/js/ server directory, together with the broadcast.js file.

In order for the policy to be satisfied and the upgrade request approved, the JavaScript file must return a value of "approved." JavaScript policy files have access to the agent variables that are sent with every upgrade request. These variables are: HOSTNAME, IP_ADDR, COMPONENT, OS, VERSION, and USERDEFINED. Developers can apply any logic to these parameters in order for the JavaScript file to return a desired value.

> Note: Just inserting return("approved"); in the JavaScript policy file will satisfy the policy and therefore approve the upgrade.

Security

On Dec. 15, 1998, the National Institute of Standards and Technology (NIST) approved the Federal Information Processing Standard (FIPS) 186-1, Digital Signature Standard (DSS). The standard implements a technique for digitally signing a document. This standard has been applied to the present invention with the following two requirements in mind:

1. Authentication: confirms that data came from a trusted source; answers the question, "Did this data come from whom I think it did?".
2. Verification: confirms the integrity of the data; answers the question, "Has the data been tampered with during transmission?".

Authentication is accomplished by DSS via asymmetric encryption, which makes use of a pair of encryption keys: a public key and a private key. These keys have the following properties:

The private key cannot be deduced from the public key.
The public key can decode messages encoded with the private key.
The public key cannot encode messages.

An algorithm encodes a message or data and digitally signs it with the private key. The recipient of the message or data then reads the digital signature and attempts to decode the message or data using the associated public key. If the recipient is successful, it means the message or data must have come from a source with access to the associated private key, and therefore from a trusted source.

To accomplish verification, DSS makes use of the Secure Hash Algorithm (SHA-1). During the generation of the digital signature with the private key, this algorithm obtains a condensed version of the message or data, called a message digest. This message digest is input to the digital signature algorithm when it generates the digital signature. The digital signature is then sent together with the data or message. When the recipient of the message or data receives it, it verifies the message digest against the actual message or data, also using SHA1 and DSS. If they do not match, the message or data has been tampered with during transmission.

The present invention implements DSS as follows:

1. The user generates and exports a unique pair of encryption keys (public and private) using The user configuration module.
2. The user imports the private key into the server.
3. The public key is included in the agent applications created with the copy of The user configuration module that generated the keys.
4. When a user creates an upgrade module, the server generates a digital signature for the module's upgrade payload using the imported private key. The digital signature includes a digest message of the payload generated with the Secure Hash Algorithm (SHA-1). The server then creates a manifest file for the payload, which includes the digital signature. The manifest file and the payload are then incorporated into the upgrade module.

5. When the agent receives the upgrade module, it reproduces the original payload and manifest file.
6. The agent then reads the digital signature using the public key and checks the digest message against the actual payload. If the digital signature is validated and the data checks out against the digest message, the agent accepts the upgrade and continues with the upgrade process.

Running the server as a Windows NT Service

When you install the server, it is automatically registered as a Windows NT service. In addition to the options available to you from the Windows NT service manager, you can use the following command line options:

-i Registers the server as an NT service with the service manager.
-r Removes the server from the NT service manager.
-s Starts the server as an NT service if it has been previously registered (see -i above). Otherwise, the server runs normally when using this option.
Note: For more information about NT services and the service manager, see the Windows NT documentation.

The Server Log Files

The server maintains log files for the information it tracks on agent and the server activity. The server rotates its log files and zeroes its data counts at midnight each day. Each set of log files is stored in a sub-directory located under /<install directory>/apps/goahead/upthe server/log/. The logs are formatted as tab-separated files that can be imported into spreadsheet or database tools for processing and report generation. You can import an entire log file into Microsoft Excel (a trademark of the Microsoft Corporation) without maintaining a connection to the original file, or import a log file into a refreshable Microsoft Excel range. See the Microsoft Excel Help for more information. The following logs are maintained by the server.

Agents Log

The Agents Log provides a list of all the agents that have made requests to the server since midnight on the log file date, and how many requests each agent has made. The Agents Log contains the following items:

TABLE 5

Agents Log

| Log Item | Description |
| --- | --- |
| gent_ip | The IP address of the Agent making the request. |
| component | The name of the Upgrade Component. |
| requests | The number of requests made by the Agent. |

Requests Log

The Requests Log lists all requests for upgrades that have been made to the server since midnight on the log file date. The Requests Log contains the following items:

TABLE 6

Requests Log

| Log Item | Description |
| --- | --- |
| hostname | The hostname of the agent that made this request. |
| ip_addr | The IP address of the agent that made this request. |
| name | The name of the Upgrade Component this request is for. |
| version | The current version of the Upgrade Component this request is for. |
| os | The operating system of the agent that made this request. |
| status | The status of the request (valid or invalid). A request could be invalidated by a policy, or because no upgrade module is available to serve the component or the device does not need an upgrade. |
| userDefined | Custom data defined by the reqdata.js file. |
| time | The date and time the request was received by the server. |

Responses Log

The Responses Log lists all the upgrade responses from the agents that have been received by the server since midnight on the log file date. An agent only sends a response if approval has been received from the server for an upgrade. The Responses Log contains the following items:

TABLE 7

Responses Log

| Log Item | Description |
| --- | --- |
| hostname | The hostname of the responding agent. |
| ip_addr | The IP address of the responding agent. |
| name | The name of the Upgrade Component for which the agent is responding. |
| version | The new version of the Upgrade Component after the upgrade is complete. If the upgrade failed, this version would be the same as the original version. |
| old_version | The original version of the Upgrade Component. |
| os | The operating system of the responding agent. |
| status | The status of the upgrade (success or fail). |
| details | Details regarding a failed upgrade |
| time | The date and time the response was sent by the agent. |

VxWorks Considerations

An agent that runs on a VxWorks target device relies on the standard VxWorks network support for TCP/IP and socket functions. NFS, FTP, and SNMP are not required. Agents on a VxWorks target device also rely on the standard VxWorks DOS file system support.

The agent files created in The user configuration module must be moved onto the VxWorks target device in their entirety. This can be done via floppy, network, or any other method used to put files on the device. This tree can be placed at the root directory, but it is recommended that it be placed in a subdirectory with a short basename such as g.

File Names

Unless the VxWorks file system volume to be used for the The present invention's application is initialized with the DOS_OPT_LONGNAMES option, all file and directory names are limited to the standard DOS eight-character name and three-character extension. The upgrade component names specified in The user configuration module and the server are used in the file system path names and therefore must be eight characters long or less.

Scheduling

The agent requires the system's real-time clock to be initialized and functional prior to running. In particular, the function clock_gettime is called by the agent and is used for scheduling events.

The agent generates files with standard system calls. In order for these files to have correct date/time stamps, the function dosFsDateTimeInstall must be used with a time formatting function to provide the current time to the dosFs library functions. Otherwise, all files will be generated with a date of Jan. 1, 1980 and a time of 00:00:00.

Loading Files

The agent object modules (upgrader.o, ej.o, and dss.o) can be linked into the VxWorks OS image and initiated at boot time. However, they can also be loaded and initiated at any other time via a shell command or invocation of the taskSpawn API. Only upgrader.o needs to be loaded by command. ej.o and dss.o will be loaded as required by upgrader.o depending on configuration parameters in upconfig.txt.

The function call to spawn the agent should look like: taskSpawn("upgrader", 100, 0, 6000, vxmain, "-h/ata0/g", "-Ttrace/txt"3"). The stack size should be at least 6000. /ata0/g should be replaced by the path to the installed agent. upconfig.txt, ej.o, dss.o, and upgrader.o should be located in this directory. The last string beginning with "-T" turns on the agent's diagnostic trace capability. It can be omitted if tracing is not required. In this example, the output will be written to a file named trace.txt. Output to the shell can be achieved by specifying "stdout" instead of a file name. The number after the colon specifies a trace detail level with 0 being the minimum and 9 the maximum.

Required Modules

There are many optional libraries and functions that can be configured into the run-time image of VxWorks. Most of these are not required to run the agent, but, a few are. Some of these are mentioned above. The following is a list of the modules required to be included in the VxWorks build in order to run the agent.

ANSI_STDIO
ANSI_STRING
ATA
DOSFS
ELT (or whatever network adapter the target uses)
IO_SYSTEM
LOADER (required if loading ej.o, dss.o, or other executable modules)
SYM_TBL
NETWORK Additional modules may be required if you want to see standard output trace messages at the console, load and initiate the agent from the shell, or reboot from floppy disk. These are:

PC_CONSOLE (required to see messages at console)
SHELL (required to load and run from the shell)
FD (required to reboot from floppy)

Refer to the VxWorks documentation for more information on building and linking VxWorks images.

Terminating an Agent

To terminate an agent in VxWorks, send a SIGKILL(15) signal to the agent task. This can be done with either the VxWorks kill shell command or program API. This will cause the agent to complete its current task and then exit cleanly. For an immediate termination, send a SIGKILL (9) signal instead. A clean termination will be attempted immediately. The td shell command or taskDelete program API can also be used. However, some open files will not be closed, and allocated resources may not be deallocated. In particular, the trace file will probably not be accessible after such a termination.

Embedded JavaScript Reference

JavaScript is a simple, cross-platform scripting language developed by Netscape Communications, Inc. and standardized as the Standard ECMA-262: ECMAScript Language Specification. The present invention has implemented a strict subset of this language, referred to as embedded JavaScript. The intent of implementing a subset of JavaScript is to control the code size of the script interpreter. The most significant capabilities of embedded JavaScript are:

arithmetic operators,
logical operators,
global functions,
local/global variables,
if, else, for and return keywords.

The most significant exceptions of embedded JavaScript are:

numbers are integers instead of floating points,
arrays and objects are not supported,
there are no function declarations.

Embedded JavaScript provides typical scripting functionality as well as a mechanism for binding embedded JavaScript function calls to computationally intensive C functions. As with any scripting language, one of the primary advantages is the quick and easy development cycle-compiling and linking is not necessary. Disadvantages include the lack of privacy, since the scripts are distributed in source form, and slower performance than compiled code. Table 8 contains a partial list of the more common language elements.

TABLE 8

Common JavaScript Language Elements

| Arithmetic | +, -, /, *, %, >>, << |
| Increment/Decrement | ++, -- |
| Logical | \|, &&, ! |
| Comparison | <, <=, ==, >=, >, != |
| Comments | //, /* . . . . */ |
| For statement | for ( ; ; ) { . . . } |
| If, then, else | if ( ) { } else { } |
| Escape Sequences | \n, \t, \b, \f, \r, \x, \u |
| Global Variables | x = 1 |
| Local Variables | var x = 1 |

Embedded JavaScript global variables warrant further explanation. An embedded JavaScript global variable lives for the life of the engine (for the present invention, one engine is open at startup time and closed on agent termination); it exists beyond the current script. A C application can declare and set these variables. The variables are then accessible by any script evaluated by the engine. This allows data to be passed from one script to another.

Embedded JavaScript can declare C functions that can be used by any embedded JavaScript interpreted by the engine. This violates the security of JavaScript, but allows the application to define and execute any action with all of the benefits of compiled C.

This binding mechanism also allows the application to extend functions such as loadModule. Many of these functions are overloaded to provide different execution based on the number of parameters passed. Since embedded JavaScript is a non-typed language, the number of parameters is the sole criteria for determining which behavior to take.

The following functions have been added to the JavaScript interpreter included with the present invention:
  addComponent
  callFunction
  cd
  config
  copyFileToMemory
  cp
  deleteComponent
  getConfig
  loadModule
  ls
  mkdir
  mv
  print
  pwd
  reboot
  rm
  rmdir
  runProcess
  startUpgrade
  stopAgent
  stopUpgrade
  trace
  unloadModule
  waitForKeystroke These functions can be used in any JavaScript file used by the present invention, either for execution by an agent or for execution by the server, such as in the case of scripted Upgrade Policies. All JavaScript variables are stored as strings. Therefore, these functions all return a string value to the script.

Note: Additional user-defined embedded JavaScript functions can be added via the addJsFunc C API."

For in-memory file system agents, the following functions may also be available:
  imSaveData
  imDeleteData
  upCopyToPersistentStorage
  upReplaceOSImage

| entryPoint | Entry point in the executable program file (required for VxWorks only). |
| priority | Optional VxWorks priority as defined in the VxWorks taskSpawn API. (Default is 100). |
| options | Optional VxWorks options as defined in the VxWorks taskSpawn API. (Default is 0). |
| stacksize | Optional VxWorks stack size as defined in the VxWorks taskSpawn API. (Default is 5000). |

DESCRIPTION

Starts a separate process. The argument includes the filename to be executed, as well as a list of space separated arguments to pass to the process.

In Windows, if the filename extension is ".bat", the file will be interpreted as a native OS scrpt file and the command interpreter will be invoked to process the script. Otherwise, the filename extension should be ".exe" and the file will be executed in the normal fashion.

In Linux, the filename extension is not significant. If the file is recognized as an executable format, it will be executed. Otherwise, the standard shell script interpreter will be invoked to process the file as a native OS script.

In VxWorks, the file will be loaded into memory and the VxWorks taskSpawn API will be invoked to start and execute the task.

Return Value runProcess returns "0" (zero) if the process was successfully started and "−1" on failure.

EXAMPLE runProcess("SampleApp.exe arg1 arg2 arg3");
runProcess("SampApp.o arg1 arg2","_SampleMain", 100, 0, 10000);

C Function Reference

C functions can be invoked by embedded JavaScripts or by executed processes. These functions enable developers to increase the configurability and functionality of the agent. Embedded JavaScript can load and call C functions by using the callFunction JavaScript API or by binding the function to a new JavaScript API using addJsFunc as described previously. Many of these functions are standard system APIs preceded by the character "g" (gchdir, gclose, etc.). Generally, if the in-memory file system feature of the agent is not being used, these APIs are converted to the standard system calls. If the in-memory file system is used, they are converted to an in-memory equivalent function where the "g" is replaced with an "im" and the first letter of the standard name is capitalized (for example, gopen becomes imOpen).

The following C functions are available in the agent and can be used to implement the embedded JavaScript binding:
  addJsFunc
  ejGetVar
  ejSetResult
  ejSetVar
  gchdir
  gclose
  gclosedir
  getDirectoryList
  ggetcwd
  glseek
  gmkdir
  gopen
  gopendir
  gread
  greaddir
  grename
  grmdir
  gstat
  gunlink
  gwrite
  loadDll
  setJsVar
  startUpgrade
  stopUpgrade
  trace
  unload DLL While the invention has been particularly shown and described with reference to a preferred embodiment, it will be apparent to those skilled in the art that various changes in form and detail may be made therein without departing from the spirit and scope of the invention.

We claim:

1. A method for upgrading a deployed device while in a networked computer environment, said method comprising:
   a) adding capability to the deployed device to poll a networked server;
   b) polling the networked server to determine if an upgrade is available for said deployed device;
   c) downloading said upgrade to the deployed device when said upgrade meets an appropriate criteria;
   d) authenticating and verifying that the upgrade is from an appropriate server and that the upgrade itself has not been modified during transmission;
   e) applying the upgrade to one or more specific components of the deployed device; and
   f) identifying and defining the specific components by the specific component's name, version, host name of a server providing the upgrade, port number for requests to the server providing the upgrade, and a polling schedule, a retry period and a number of retry attempts to be made.

2. The method of claim 1 wherein the networked server contains upgrade policies controlling said upgrade, the upgrade policies defining what deployed devices are eligible to receive the upgrade.

3. The method of claim 1 further including the polling of the networked server being scheduled on a predetermined basis.

4. A system for implementing upgrades to deployed devices while in a networked environment, said system comprising:
   a) an agent added to the deployed device wherein said agent includes a capability of polling a networked server to determine if an upgrade is available for said deployed device;
   b) the networked server enabled to transmit said upgrades to the deployed device when a predetermined criteria for said upgrade is substantially matched;
   c) a capability of the deployed device to authenticate and verify that the upgrade is from an appropriate said networked server and that the upgrade itself has not been modified during transmission to said deployed device; and
   d) a specific components of the deployed device are identified and defined by the specific component's name, version, host name of a server providing the upgrade, and a polling schedule, a retry period and a number of retry attempts to be made.

5. The system of claim 4 wherein the networked server applies a predetermined upgrade policy prior to transmission of said upgrade, said upgrade policy identifying and defining which specific deployed devices are eligible to receive the upgrade.

6. The system of claim 4 wherein the polling occurs at predetermined intervals.

7. A system for implementing an upgrade to a deployed device while in a networked environment, said system comprising:
   a) deployed device means for receiving upgrade notifications from a networked server;
   b) networked server means for transmitting said upgrade to the deployed device when a predetermined criteria for said upgrade is substantially matched;
   c) networked server means for determining that the deployed device is eligible to receive said upgrade; and
   d) means for specific components of the deployed device to be identified and defined by a component's name, version, host name of the server providing the upgrade, and a polling schedule, a retry period and a number of retry attempts to be made.

* * * * *